(12) United States Patent
Mizobata

(10) Patent No.: US 7,061,930 B2
(45) Date of Patent: Jun. 13, 2006

(54) DATA SELECTION/STORAGE APPARATUS AND DATA PROCESSING APPARATUS USING DATA SELECTION/STORAGE APPARATUS

(75) Inventor: Norihiko Mizobata, Habikino (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 844 days.

(21) Appl. No.: 09/973,090

(22) Filed: Oct. 10, 2001

(65) Prior Publication Data

US 2002/0064188 A1    May 30, 2002

(30) Foreign Application Priority Data

Oct. 10, 2000    (JP)    .............................. 2000-308576

(51) Int. Cl.
*H04L 12/54*    (2006.01)

(52) U.S. Cl. ...................................... 370/429; 370/532

(58) Field of Classification Search ........ 370/412–429, 370/532–535
See application file for complete search history.

(56) References Cited

U.S. PATENT DOCUMENTS

| 5,475,754 | A | 12/1995 | Bridgewater et al. ......... 380/20 |
| 5,521,979 | A | 5/1996 | Deiss |
| 5,613,003 | A | 3/1997 | Bridgewater et al. ......... 380/20 |
| 5,898,695 | A | * 4/1999 | Fujii et al. ................... 370/464 |
| 6,445,872 | B1 | 9/2002 | Sano et al. ................... 386/46 |
| 6,477,185 | B1 | * 11/2002 | Komi et al. ................ 370/536 |

FOREIGN PATENT DOCUMENTS

| EP | 0 785 675 A2 | 7/1997 |
| JP | 9-200691 | 7/1997 |
| JP | 9-252446 | 9/1997 |
| JP | 9-326993 | 12/1997 |
| JP | 11-150564 | 6/1999 |
| WO | WO97/46013 | 12/1997 |

* cited by examiner

*Primary Examiner*—Dang Ton
*Assistant Examiner*—Phuc Tran
(74) *Attorney, Agent, or Firm*—Steptoe & Johnson LLP

(57) ABSTRACT

A demultiplexer is provided with a PID extractor for extracting a PID of each TS packet from an inputted transport stream; a PID comparator for detecting whether or not the extracted PID matches any of PIDs which are set on a PID table, and outputting an entry number of the PID table where the corresponding PID is set, as a matching PID entry number, when a match is detected; a packet selector for selecting TS packets whose PIDs are detected by the PID comparator; and a data storage controller for determining an area in a memory where each TS packet is to be stored, according to the matching PID entry number; wherein TS packets having different PIDs are multiplexed and stored into a video data storage area in the memory. Therefore, when plural kinds of video data are included in the same program on digital broadcasting, these plural kinds of video data can be reproduced simultaneously.

11 Claims, 13 Drawing Sheets video data storage area (matching PID entry number=0~2)

audio data storage area (matching PID entry number=3)

program data storage area (matching PID entry number=4)

video data storage area (matching PID entry number=0~2)

□ ① ② = assigned matching PID entry numbers audio data storage area (matching PID entry number=3)

program data storage area (matching PID entry number=4)

matching entry area number video data storage area (area number=2)

audio data storage area (area number=1)

program data storage area (area number=0)

video data storage area (area number=2)

Video data PID of program a is changed.

audio data storage area (area number=1)

program data storage area (area number=0)

matching entry area number

AV data storage area 2 (area number=2)

AV data storage area (area number=1)

program data storage area (area number=0)

Prior Art
Fig.13(a)
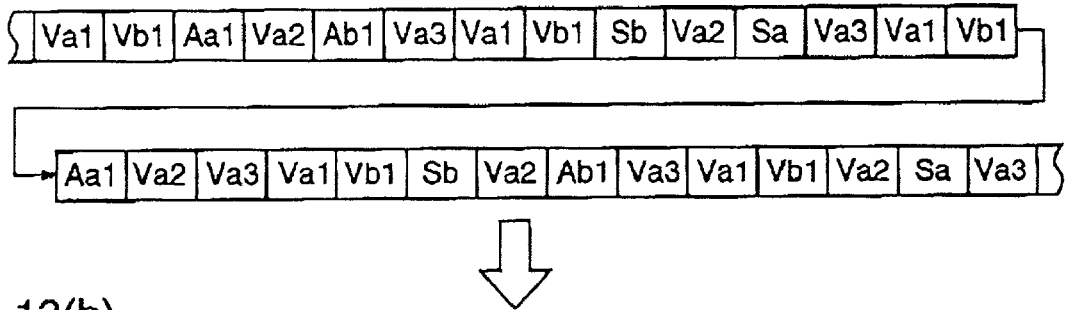
Fig.13(b)
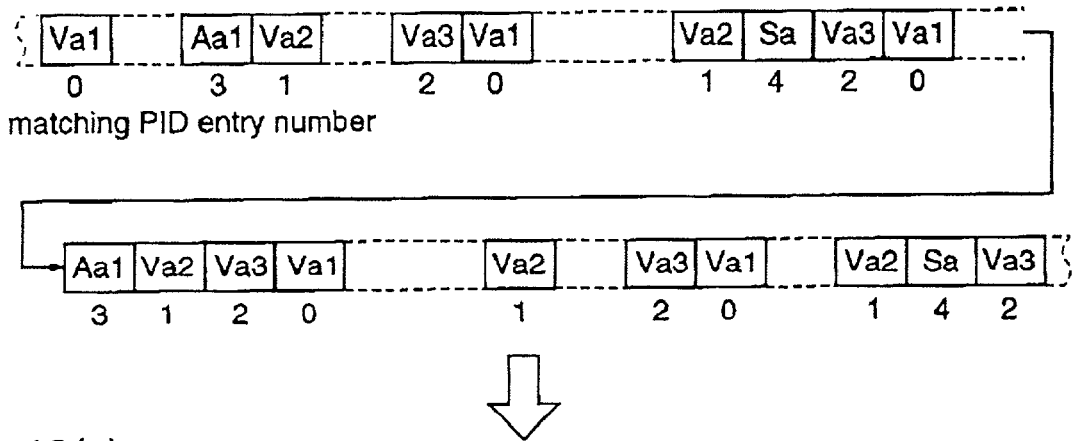
Fig.13(c)
video data storage area 1 (matching PID entry number=0)
| Va1 | Va1 | Va1 | Va1 | Va1 | |
video data storage area 2 (matching PID entry number=1)
| Va2 | Va2 | Va2 | Va2 | Va2 | |
video data storage area 3 (matching PID entry number=2)
| Va3 | Va3 | Va3 | Va3 | Va3 | |
audio data storage area (matching PID entry number=3)
| Aa1 | Aa1 | |
program data storage area (matching PID entry number=4)
| Sa | Sa | |

DATA SELECTION/STORAGE APPARATUS AND DATA PROCESSING APPARATUS USING DATA SELECTION/STORAGE APPARATUS

FIELD OF THE INVENTION

The present invention relates to a data selection/storage apparatus which selects desired data from multiplexed data in which plural kinds of data, such as video data and audio data, are multiplexed, and stores the selected data.

BACKGROUND OF THE INVENTION

In recent years, transmission or storage of video, audio, and other data in digital form has been increasingly carried out. In this case, these data are divided and reconstructed into plural pieces of data such as packets, each having a data structure comprising several fields, and thereafter, the plural pieces of data (packets) are multiplexed into a single transmission or storage medium to be transmitted or stored. As a standard of data structure and multiplexing in this case, there is the MPEG system standard (ISO/IEC 13818-1). In many cases, transmission or storage of data has been carried out by a method based on the packet data structure of the MPEG system standard.

In the system where such packet data are multiplexed, an apparatus for receiving the data must select data-to-be-received from the multiplexed packet data. To be specific, the data reception apparatus must identify various kinds of data attendant on a program, such as video data, audio data, PSI (Program Specific information), SI (Service information) and the like to select only required data, and store the selected data according to the types of the respective data. The stored video data is inputted to a video decoder to reproduce a picture, the audio data is inputted to an audio decoder to reproduce a sound, and the information such as PSI or SI is processed by software to be displayed for viewers, or it is used for controlling the operation of the data reception apparatus.

Hereinafter, a description will be given of a demultiplexer performing data selection, which is used in a receiver of digital broadcasting or the like that employs a data multiplexing method based on the MPEG system standard.

In the MPEG system standard, various kinds of data, such as video data, audio data, and others, are multiplexed into a data stream in a form called transport stream packets (hereinafter referred to as TS packets), and each TS packet is given a packet identifier (hereinafter referred to as PID) indicating the type of data. In the demultiplexer, inputted TS packets are sorted according to their PIDS, and data extracted from required TS packets are stored in storage areas in a buffer memory corresponding to the respective PIDs.

As a technique relating to selection and storage of data in the conventional demultiplexer, there is "Inverse Transport Processor having Memory Address Circuit" which is disclosed in Japanese Published Patent Application No. Hei.7-297855 (corresponding to U.S. Pat. No. 5521979, "Packet Video Signal Inverse Transport System"). In the conventional demultiplexer, data selected according to PIDs (SC-IDs in the above-mentioned literature) are stored in data storage areas in a memory corresponding to the respective PIDS.

However, the conventional data selection/storage apparatus comprising the demultiplexer and the memory has drawbacks as follows. Hereinafter, the drawbacks will be described for the case where a transport stream shown in FIG. 1 is inputted to the conventional data selection/storage apparatus.

With reference to FIG. 1, data of two programs a and b are multiplexed in a transport stream. The program a is composed of three kinds of video data (TS packets having PIDs of Va1, Va2, Va3), one kind of audio data (TS packets having a PID of Aa1), and one kind of program information data (TS packets having a PID of Sa). The program b is composed of one kind of video data (TS packets having a PID of Vb1), one kind of audio data (TS packets having a PID of Ab1), and one kind of program information data (TS packets having a PID of Sb). Hereinafter, the program information data is abbreviated as "program data".

A description will be given of the case where the program a is taken from the transport stream shown in FIG. 1 and reproduced, in the conventional data selection/storage apparatus, with reference to FIGS. 13(a)–13(c).

FIG. 13(a) is a diagram illustrating a transport stream to be inputted to the demultiplexer, FIG. 13(b) is a diagram illustrating the contents of TS packets which are selected from the transport stream shown in FIG. 13(a) by the demultiplexer, and FIG. 13(c) is a diagram illustrating the state where the TS packets selected by the demultiplexer are stored in the memory.

The demultiplexer selects the TS packets constituting the program a (the TS packets having the PIDs of Va1, Va2, Va3, Aa1, and Sa) from the transport stream shown in FIG. 13(a), whereby only the TS packets shown in FIG. 13(b) are obtained.

In the conventional demultiplexer, the selected data are stored in the storage areas in the memory corresponding to the respective PIDs. To be specific, as shown in FIG. 13(c), the video data of the TS packets having the PIDs of Va1, Va2, and Va3 are stored in video data storage areas 1, 2, and 3, respectively, and the audio data of the TS packets having the PID of Aa1 are stored in an audio data storage area, and the program data of the TS packets having the PID of Sa are stored in a program data storage area. The video data from one of the video data storage areas 1, 2, and 3 are inputted to the video decoder to be reproduced as a picture.

In recent years, a digital television broadcast having plural kinds of video data in one program, like the program a in the transport stream shown in FIG. 1, has been considered. Accordingly, a digital television broadcast receiver is required to reproduce plural pictures on the same screen at the same time.

In the conventional demultiplexer, however, data are stored in different storage areas in the memory corresponding to the PIDs of the data, and only video data having one PID are transmitted to the video decoder. Therefore, only one picture is reproduced at a time, and the structure of the IF connecting the demultiplexer and the decoder must be considerably altered to reproduce plural pictures on the same screen at the same time.

Furthermore, when the PID of the TS packets which store the video data is changed (for example, when a program a the viewer has watched is ended and, subsequently, a program c comes on the air), the conventional demultiplexer is required to select both of the video data having the PIDs before and after the program change at the same time, store the respective video data in different storage areas in the memory, and switch the data storage area to send the video data to the video decoder in accordance with the timing at which the PID of the video data to be aired is changed (i.e., the timing at which the program a is switched to the program c).

Accordingly, the contents of processing of the demultiplexer are complicated, and the timing to output the video data to the video decoder is delayed when the program is switched.

SUMMARY OF THE INVENTION

The present invention is made to solve the above-described problems and has for its object to provide a data selection/storage apparatus that enables simultaneous reproduction and display of plural pictures on a screen, and that facilitates switching of video data to be outputted to the video decoder when the program is switched and the PID of TS packets to be received is changed.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data selection/storage apparatus having a data selection means for selecting specific kinds of data from multiplexed data in which plural kinds of data are multiplexed, and a data storage means having plural storage areas for holding the data selected by the data selection means, wherein, among the data selected by the data selection means, plural kinds of data which have previously been specified are multiplexed and stored in one storage area by the data storage means. Therefore, the plural kinds of data, which are multiplexed and stored in the storage area of the data storage means, can be simultaneously transmitted to an external data reproduction apparatus, and the data reproduction apparatus can perform simultaneous reproduction of plural kinds of video data and the like.

According to a second aspect of the present invention, in the data selection/storage apparatus according to the first aspect, the data selection means comprises: an identification number extraction means for extracting an identification number which indicates the kind of each data, from the multiplexed data in which plural kinds of data are multiplexed; an identification number storage means having plural identification number entries which holds identification numbers of data to be selected; an identification number matching detection means for detecting whether or not the identification number extracted from the multiplexed data matches at least one of the plural identification numbers stored in the identification number storage means; a data extraction means for extracting, from the multiplexed data, the data which matches the identification number stored in the identification number storage means; an identification code addition means for adding an identification code for identifying the kind of data, to the data extracted by the data extraction means; and a data storage control means for storing each data in a predetermined storage area in the data storage means, on the basis of the identification code which is added to the data by the identification code addition means; and when it has previously been specified that plural kinds of data which are selected from the multiplexed data and have different identification numbers should be stored in one storage area in the data storage means, the data storage control means multiplexes the plural kinds of data and stores the multiplexed data in the storage area. Therefore, the plural kinds of data, which are multiplexed and stored in the storage area of the data storage means, can be simultaneously transmitted to an external data reproduction apparatus, and the data reproduction apparatus can perform simultaneous reproduction of plural kinds of video data and the like.

According to a third aspect of the present invention, in the data selection/storage apparatus according to the second aspect, the identification code addition means adds the number of an identification number entry in the identification number storage means, as an identification code, to the data having the corresponding identification number; and, when it has previously been specified that plural kinds of data having different identification codes should be stored in one storage area, the data storage control means multiplexes the plural kinds of data and stores the multiplexed data in the storage area. Therefore, the plural kinds of data, which are multiplexed and stored in the storage area of the data storage means, can be simultaneously transmitted to an external data reproduction apparatus, and the data reproduction apparatus can perform simultaneous reproduction of plural kinds of video data and the like.

According to a fourth aspect of the present invention, in the data selection/storage apparatus according to the third aspect, when there are plural correspondences between plural identification codes and one storage area, the data storage control means multiplexes the plural kinds of data having different identification codes and stores the multiplexed data in the corresponding storage area, on the basis of the correspondences between the identification codes and the data storage area, which have previously been specified. Therefore, video data and audio data of different programs can be respectively multiplexed and stored in different storage areas, and the respective multiplexed data can be transmitted to different external data reproduction apparatuses, whereby pictures and sounds of plural programs can be decoded simultaneously.

According to a fifth aspect of the present invention, in the data selection/storage apparatus according to the second aspect, each of the identification number entries of the identification number storage means stores not only the identification number of data to be selected but also a storage area number which indicates a storage area in the data storage means wherein the data having the corresponding identification number should be stored; the identification code addition means adds the storage area number in the identification number storage means, as an identification code, to each data extracted by the data extraction means; and when the same storage area number is stored for different identification numbers in the identification number storage means, the data storage control means multiplexes the plural kinds of data having the different identification numbers and stores the multiplexed data in the storage area having the storage area number. Therefore, the plural kinds of data, which are multiplexed and stored in the storage area of the data storage means, can be simultaneously transmitted to an external data reproduction apparatus whereby the data reproduction apparatus can perform simultaneous reproduction of plural kinds of video data and the like.

According to a sixth aspect of the present invention, in the data selection/storage apparatus according to the fifth aspect, when there are plural correspondences between different identification numbers and the same storage area number in the identification number storage means, the data storage control means multiplexes the plural kinds of data indicated by the different identification numbers and stores the multiplexed data in the storage area indicated by each storage area number, on the basis of the storage area number. Therefore, video data and audio data of different programs can be respectively multiplexed and stored in different storage areas, and the respective multiplexed data can be transmitted to different external data reproduction apparatuses, whereby pictures and sounds of plural programs can be decoded simultaneously.

According to a seventh aspect of the present invention, in the data selection/storage apparatus according to the second aspect, when plural kinds of data having different identification numbers are to be storage in the same storage area in the data storage means, the data storage control means stores information for identifying each data together with the data. Therefore, when an external apparatus, such as a data reproduction apparatus, processes the plural kinds of data which are multiplexed and stored in the data storage means of the data selection/storage apparatus, the external apparatus can easily identify the respective data in the multiplexed data and demultiplex the multiplexed data.

According to an eighth aspect of the present invention, in the data selection/storage apparatus according to the second aspect, information in each identification number entry which is stored in the identification number storage means can be arbitrarily set by an external control circuit. Therefore, allocation of the storage areas in the data storage means to the identification numbers of data to be stored therein can be arbitrarily carried out.

According to a ninth aspect of the present invention, in the data selection/storage apparatus according to the eighth aspect, when the kind of data to be inputted to the data selection/storage apparatus should be changed, information indicating the kind of data to be newly inputted is transmitted, in advance of the change, to the external control circuit; and the information in each identification number entry which is stored in the identification number storage means is newly set on the basis of the information indicating the kind of data to be newly inputted. Therefore, even when a program comprising video data and the like is switched to another program, the program switching can be smoothly carried out.

According to a tenth aspect of the present invention, there is provided a data processing apparatus comprising; a data selection/storage unit having a data selection means for selecting specific kinds of data from multiplexed data in which plural kinds of data are multiplexed, and a data storage means having plural storage areas for holding the data selected by the data selection means; and a data reproduction unit for reading the data stored in the data storage means of the data selection/storage unit, and reproducing the read data; wherein the data selection/storage unit stores plural kinds of data, among the data selected by the data selection means, into plural storage areas, respectively; and the data reproduction unit is able to output plural data request signals as many as the number of kinds of data to be reproduced simultaneously. Therefore, the data reproduction apparatus can take plural pieces of desired data from the plural kinds of data respectively storage in the plural storage areas in the data storage means, whereby the data reproduction apparatus can perform simultaneous reproduction of plural kinds of video data and the like.

According to an eleventh aspect of the present invention, there is provided a data processing apparatus comprising a data selection/storage apparatus according to the first aspect, and a data reproduction apparatus for reading the data stored in the data storage means of the data selection/storage apparatus and reproducing the read data; wherein the data reproduction apparatus reads, from a storage area wherein plural kinds of data having different identification numbers are multiplexed, the multiplexed data and reproduces the multiplexed data, which storage data is included in the data storage means of the data selection/storage apparatus. Therefore, the data reproduction apparatus can simultaneously take the plural kinds of data which are multiplexed and stored in the data storage means of the data selection/storage apparatus, whereby the data reproduction apparatus can perform simultaneous reproduction of plural kinds of video data and the like.

According to a twelfth aspect of the present invention, in the data processing apparatus according to the eleventh aspect, a plurality of the data reproduction apparatuses are provided; and when the data selection/storage apparatus has plural storage areas, each holding multiplexed plural kinds of data, each of the plural data reproduction apparatuses reads the multiplexed data from the corresponding storage area, and reproduces the read data. Therefore, video data and audio data of different programs can be multiplexed and stored in different storage areas, respectively, and the respective multiplexed data can be transmitted to different external data reproduction apparatuses, whereby pictures and sounds of plural programs can be decoded simultaneously.

BRIEF DESCRIPTION OF THE DRAWINGS

FIGS. 13(*a*)–13(*c*) are diagrams for explaining a data selection process by the conventional data selection/storage apparatus or the data selection/storage apparatus according to the sixth embodiment of the invention.

DETAILED DESCRIPTION OF THE PREFERRED EMBODIMENTS

Embodiment 1

Hereinafter, a description will be given of a digital broadcast receiver which is able to receive and reproduce a program including plural kinds of video data in digital broadcasting bused on the MPEG system standard, and a data selection/storage apparatus contained in the digital broadcast receiver, as a first embodiment of the present invention.

In digital broadcasting, video data, audio data, and other data are transmitted in a transport stream. The transport stream is composed of transport stream packets (TS packets) having a fixed length, and each TS packet is given a packet identifier (PID) as an identification number indicating the type of data included in the TS packet.

Figure 1:
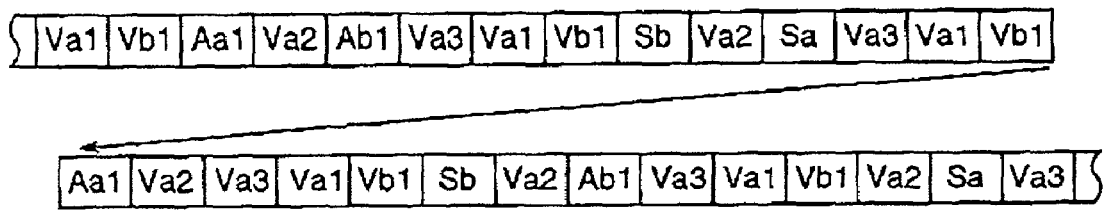
FIG. 1 is a diagram for explaining a transport stream.

FIG. 1 shows a transport stream which transmits two programs a and b. In FIG. 1, data of the two programs a and b are multiplexed in the transport stream. The program a is composed of three kinds of video data (TS packets having PIDs of Va1, Va2, Va3), one kind of audio data (TS packets having a PID of Aa1), and one kind of program data (TS packets having a PID of Sa). The program b is composed of one kind of video data (TS packets having a PID of Vb1), one kind of audio data (TS packets having a PID of Ab1), and one kind of program data (TS packets having a PID of Sb). Although plural kinds of program data are usually broadcast for one program, it is assumed in this first embodiment that only one kind of program data is broadcast, for simplification.

Figure 2:
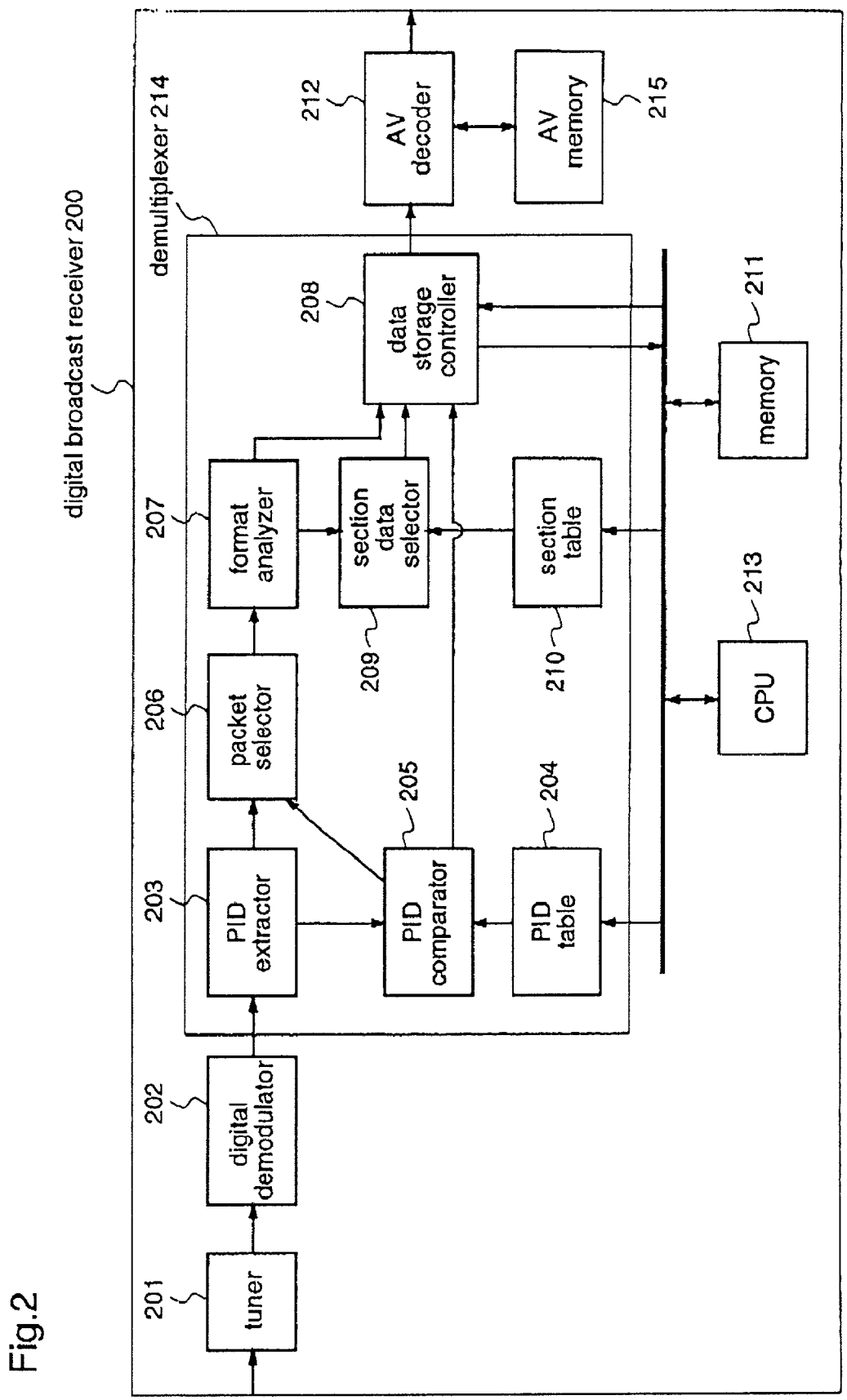
FIG. 2 is a block diagram illustrating the construction of a digital broadcast receiver according to first, second, third, and fourth embodiments of the present invention.

FIG. 2 is a block diagram illustrating the construction of a digital broadcast receiver 200.

A digital broadcast received by the digital broadcast receiver 200 is tuned by a tuner 201, subjected to digital demodulation and error correction by a digital demodulator 202, and outputted as a transport stream to a demultiplexer 214.

The demultiplexer 214 is provided with a PID extractor 203, a PID table 204, a PID comparator 205, a packet selector 206, a format analizer 207, a data storage controller 208, a section data selector 209, and a section table 210.

The PID extractor 203 (identification number extraction means) receives the transport stream outputted from the digital demodulator 202, extracts a PID from each TS packet, and outputs the PID to the PID comparator 205 (identification number matching detection means). On the PID table 204 (identification number storage means), PID entries of TS packets constituting a program to be received are previously set by a CPU 213 (external control circuit). The CPU 213 can arbitrarily rewrite these PID entries. Further, the CPU 213 can set a new PID entry in a vacant entry, or it can delete an unnecessary entry.

The PID comparator 205 checks whether there is an entry which matches the PID extracted from the TS packet among the plural PID entries on the PID table 204, and outputs the comparison result to the packet selector 206 (data extraction means).

The packet selector 206 is supplied with the TS packet extracted by the PID extractor 203. When the PID comparison result from the PID comparator 205 is "match", the packet selector 206 outputs this TS packet to the format analyzer 207. When the PID comparison result is "mismatch", this TS packet is discarded by the packet selector 206.

Generally, transmission of video data and audio data is carried out such that data in a PES packet format are stored in TS packets to be transmitted. So, the format analyzer 207 extracts PES packets of video data and audio data, and outputs the PES packets to the data storage controller 208 (data storage control means). On the other hand, transmission of program data such as a program table or the like is generally carried out such that data in a section data format are stored in TS packets to be transmitted. So, the format analyzer 207 extracts section data of program data, and outputs the section data to the section data selector 209.

The section data selector 209 checks whether the section data supplied from the format analyzer 207 matches any of the candidates of section data to be received, which are stored on the section table 210. When there is matching section data, the section data selector 209 outputs the section data (program data) to the data storage controller 208.

The data storage controller 208 manages a plurality of data storage areas in a memory 211 (data storage means). Further, when the data storage controller 208 receives the video data and audio data from the format analyzer 207, the controller 208 writes the video data and audio data into data storage areas for video data and audio data (hereinafter referred to as video data storage area and audio data storage area) in the memory 211. when the data storage controller 208 receives the program data from the section data selector 209, the controller 208 writes the program data in a data storage area for program data (hereinafter referred to as a program data storage area) in the memory 211. The program data written in the memory 211 is read by the CPU 213 to be displayed for the viewer or used for controlling the operation of the digital broadcast receiver 200.

The data storage controller 208 reads the video data and audio data from the memory 211 in response to a request from an AV (audiovisual) decoder 212 (data reproduction apparatus), and outputs the read data to the AV decoder 212.

The AV decoder 212 reproduces the video data and audio data from the data storage controller 208.

In this first embodiment, a description will be given of the case where, in the digital broadcast receiver 200, the program a is selected from the transport stream shown in FIG. 1, and three kinds of video data included in the program a are decoded simultaneously. Hereinafter, the operation of the data selection/storage apparatus comprising the demultiplexer 214 and the memory 211 will be mainly described with reference to FIGS. 3 and 4(a)–4(c).

Figure 3:
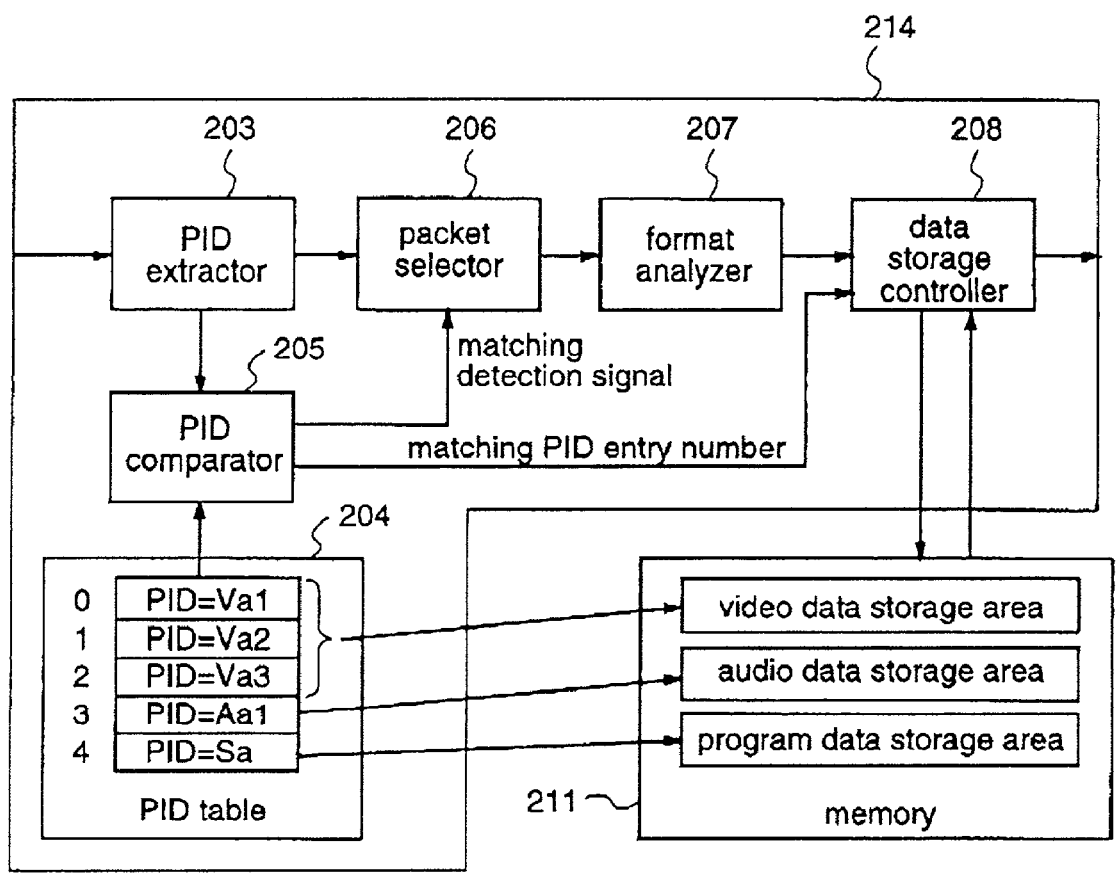
FIG. 3 is a block diagram illustrating the construction of a data selection/storage apparatus according to the first and second embodiments of the invention.

FIG. 3 is a block diagram illustrating the construction of the data selection/storage apparatus according to the first embodiment. In FIG. 3, the same reference numerals as those shown in FIG. 2 denote the same or corresponding parts.

Figure 4A:
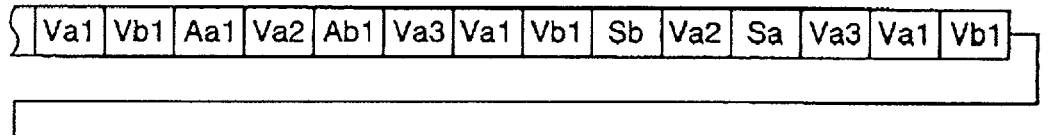
FIGS. 4(*a*)–4(*c*) are diagrams for explaining a data selection process by the data selection/storage apparatus according to the first embodiment of the invention.
Figure 4A:
Figure 4B:
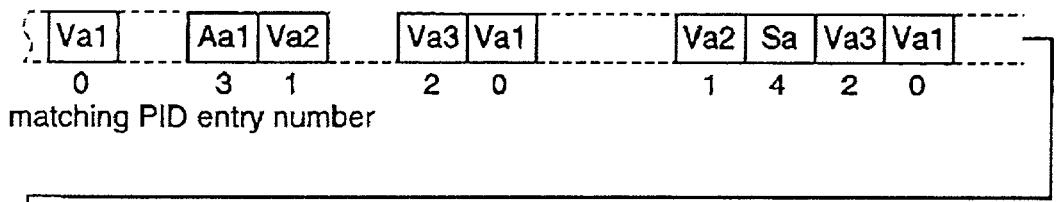
Figure 4B:
Figure 4C:
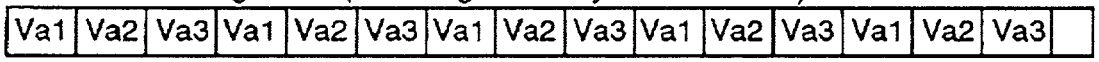
Figure 4C:
Figure 4C:
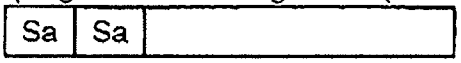
Figure 5A:
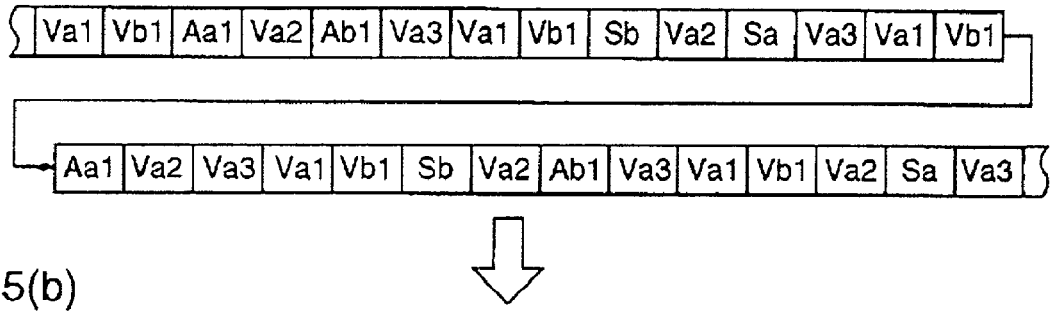
FIGS. 5(*a*)–5(*c*) are diagrams for explaining a data selection process by the data selection/storage apparatus according to the second embodiment of the invention.
Figure 5B:
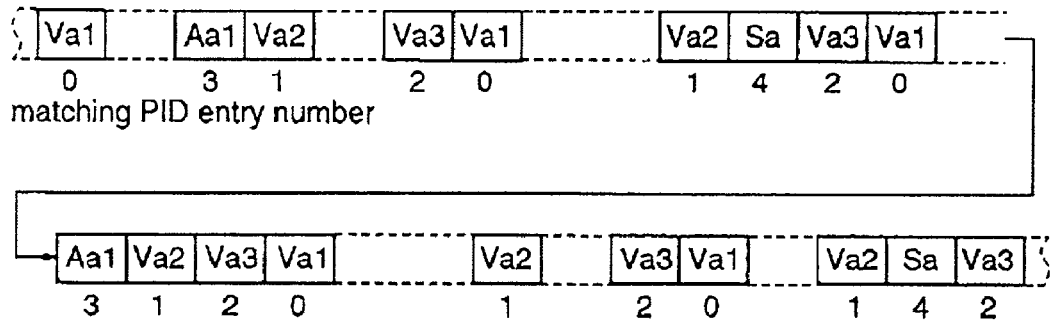
Figure 5C:
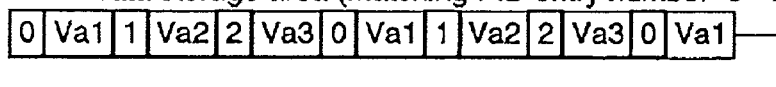
Figure 5C:
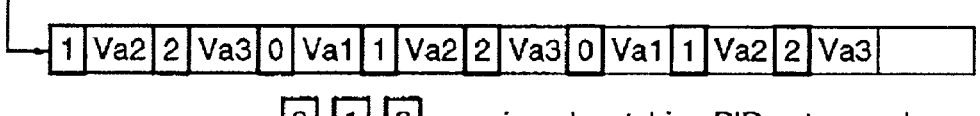
Figure 5C:
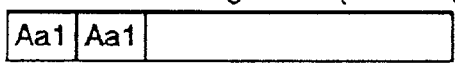
Figure 5C:

FIG. 4(a) is a diagram illustrating a transport stream to be inputted to the demultiplexer, FIG. 4(b) is a diagram illustrating the contents of TS packets which are selected from the transport stream data shown in FIG. 4(a) by the demultiplexer, and FIG. 4(c) is a diagram illustrating the state where the TS packets selected by the demultiplexer are stored in the memory.

The transport stream shown in FIG. 4(a) is composed of two programs a and b including video data, audio data, and program data with PIDs as shown in Table 1 and Table 2, respectively.

TABLE 1 program a

| type of data | PID |
| --- | --- |
| video data 1 | Va1 |
| video data 2 | Va2 |
| video data 3 | Va3 |
| audio data | Aa1 |
| program data | Sa |

TABLE 2 program b

| type of data | PID |
| --- | --- |
| video data | Vb1 |
| audio data | Ab1 |
| program data | Sb |

In order to select the program a by the demultiplexer 214, PIDs are previously set on the PID table 204 by the CPU 213 as shown in Table 3.

TABLE 3

| PID entry No. | PID |
| --- | --- |
| 0 | Va1 |
| 1 | Va2 |
| 2 | Va3 |
| 3 | Aa1 |
| 4 | Sa |

When the transport stream shown in FIG. 4(a) is inputted to the PID extractor 203, the PID extractor 203 extracts the PID from each TS packet, and outputs it to the PID comparator 205.

The PID comparator 205 checks whether the PID supplied from the PID extractor 203 matches any of the PIDs which are set on the PID table 204. When the received PID matches any of the PIDs on the PID table 204, the PTD comparator notifies the packet selector 206 that there is a matching PID, as a matching detection signal. At the same time, the comparator 204 notifies the data storage controller 208 of the PID entry number on the PID table 204 where the matching PID is entered, as a matching PID entry number. On the other hand, when the PID extracted from the TS packet matches none of the PIDs on the PID table 204, the PID comparator 205 notifies the packet selector 206 that the comparison result is "mismatch", as a matching detection signal.

When the matching detection signal from the PID comparator 205 indicates "match", the packet selector 206 outputs the corresponding TS packet to the format analyzer 207. When the match detection signal indicates "mismatch", the packet selector 206 discards the TS packet. As the result, only the TS packets constituting the program a are selected from the transport stream inputted to the packet selector 206, as shown in FIG. 4(b).

The data storage controller 208 adds the matching PID entry number supplied from the PID comparator 205 to each TS packet supplied from the format analyzer 207. Further, the data storage controller 208 manages three storage areas in the memory 211, i.e., the video data storage area, the audio data storage area, and the program data storage area, and writes the TS packet data into any of these storage areas, according to the matching PID entry number of each TS packet.

The matching PID entry numbers given to the respective TS packet data are associated with the storage areas in the memory 211 as shown in Table 4.

TABLE 4

| matching PID entry No. | storage area |
| --- | --- |
| 0 | video data storage area |
| 1 | video data storage area |
| 2 | video data storage area |
| 3 | audio data storage area |
| 4 | program data storage data |

As shown in FIG. 4(c), the data storage controller 208 stores all of the video data having the three kinds of PIDs (Va1, Va2, Va3), as video data to be multiplexed, in one video data storage area in the memory 211.

The AV decoder 212 controls the data storage controller 208 to read the video data of the program a from the video data storage area in the memory 211. At this time, since the video data of the three kinds of PIDs (Va1, Va2, Va3) are multiplexed into one video data storage area as shown in FIG. 4(c), the three kinds of video data to be reproduced are sequentially transmitted from the data storage controller 208 to the AV decoder 212.

As described above, according to the data selection/storage apparatus of the first embodiment, plural kinds of video data included in a program are selected by the demultiplexer 214, and the plural kinds of video data are sequentially written in a video data storage area in the memory 211. Therefore, the AV decoder 212 can sequentially read the plural kinds of video data from the video data storage area, and reproduce the video data simultaneously on the basis of the PIDs of the respective video data, whereby plural pictures can be simultaneously displayed on a screen.

Embodiment 2

Next, a description will be given of a data selection/storage apparatus which facilitates decoding of video data stored in a data storage area, as a second embodiment of the present invention.

In the above-described first embodiment, since the video data are multiplexed and stored into one video data storage area in the memory 211 as shown in FIG. 4(c), when the AV decoder 212 performs decoding, the AV decoder 212 must identify the multiplexed three kinds of video data on the basis of the PIDs of the respective video data.

Therefore, the AV decoder 212 extracts the PIDs (Va1, Va2, Va3) again from the three kinds of video data which are read from the video data storage area, identifies the respective video data on the basis of the PIDs, and decodes the packets having the respective PIDs as different video data. That is, it is necessary to repeat the same processes as the PID matching detection and the packet selection, which have been carried out by the PID extractor 203, the PID table 204, the PID comparator 205, and the packet selector 206 in the demultiplexer 214.

In order to avoid this repetition, the data selection/storage apparatus according to the second embodiment is constructed such that, when the data storage controller writes the video data in the data storage area, information for identifying each video data is written in the storage area together with the video data.

Hereinafter, the data selection/storage apparatus according to the second embodiment will be described in more detail. Since the constructions of the digital broadcast receiver and the data selection/storage apparatus according to this second embodiment are identical to those described for the first embodiment, FIGS. 2 and 3 will be used for the description.

FIG. 5(*a*) is a diagram illustrating a transport stream to be inputted to the demultiplexer, FIG. 5(*b*) is a diagram illustrating the contents of TS packets which are selected from the transport stream shown in FIG. 5(*a*) by the demultiplexer, and FIG. 5(*c*) is a diagram illustrating the state where the data selected by the demultiplexer are stored in the memory.

In the demultiplexer 214, when the data storage controller 208 writes the video data selected by the packet selector 206 (refer to FIG. 5(*b*)) into the video data storage area in the memory 211, the data storage controller 208 adds the matching PID entry number detected by the PID comparator 205 to the video data, and writes the video data with the matching PID entry number into the video data storage area. To be specific, as shown in FIG. 5(*c*), the video data packet having the PID (=Va1) which is set in the entry 0 of the PID table 204 is given "0" as the matching PID entry number, and the video data packet having the PID (=Va2) which is set in the entry 1 is given "1" as the matching PID entry number, and the video data packet having the PID (=Va3) which is set in the entry 2 is given "2" as the matching PID entry number.

since the AV decoder 212 reads the matching PID entry number given to each video data in advance of reading the multiplexed video data recorded in the video data storage area in the memory 211, the AV decoder 212 can identify the three kinds of video data without extracting the PIDs from the video data and comparing the PIDs.

As described above, according to the data selection/storage apparatus of the second embodiment, it is possible to realize simultaneous reproduction of plural kinds of video data without complicating the construction and processing contents of the AV decoder 212.

Embodiment 3

In a third embodiment of the present invention, a description will be given of the case where, in the digital broadcast receiver 200, a program a is selected from a transport stream in which two programs a and b are multiplexed as shown in FIG. 7(*a*), and three kinds of vide data included in the program a are decoded and reproduced. Hereinafter, the operation of the data selection/storage apparatus comprising the demultiplexer and the memory will be mainly described with reference to FIGS. 6 and 7(*a*)–7(*c*).

Since the construction of the digital broadcast receiver according to this third embodiment is identical to the digital broadcast receiver 200 according to the first embodiment shown in FIG. 2, repeated description is not necessary.

Figure 6:
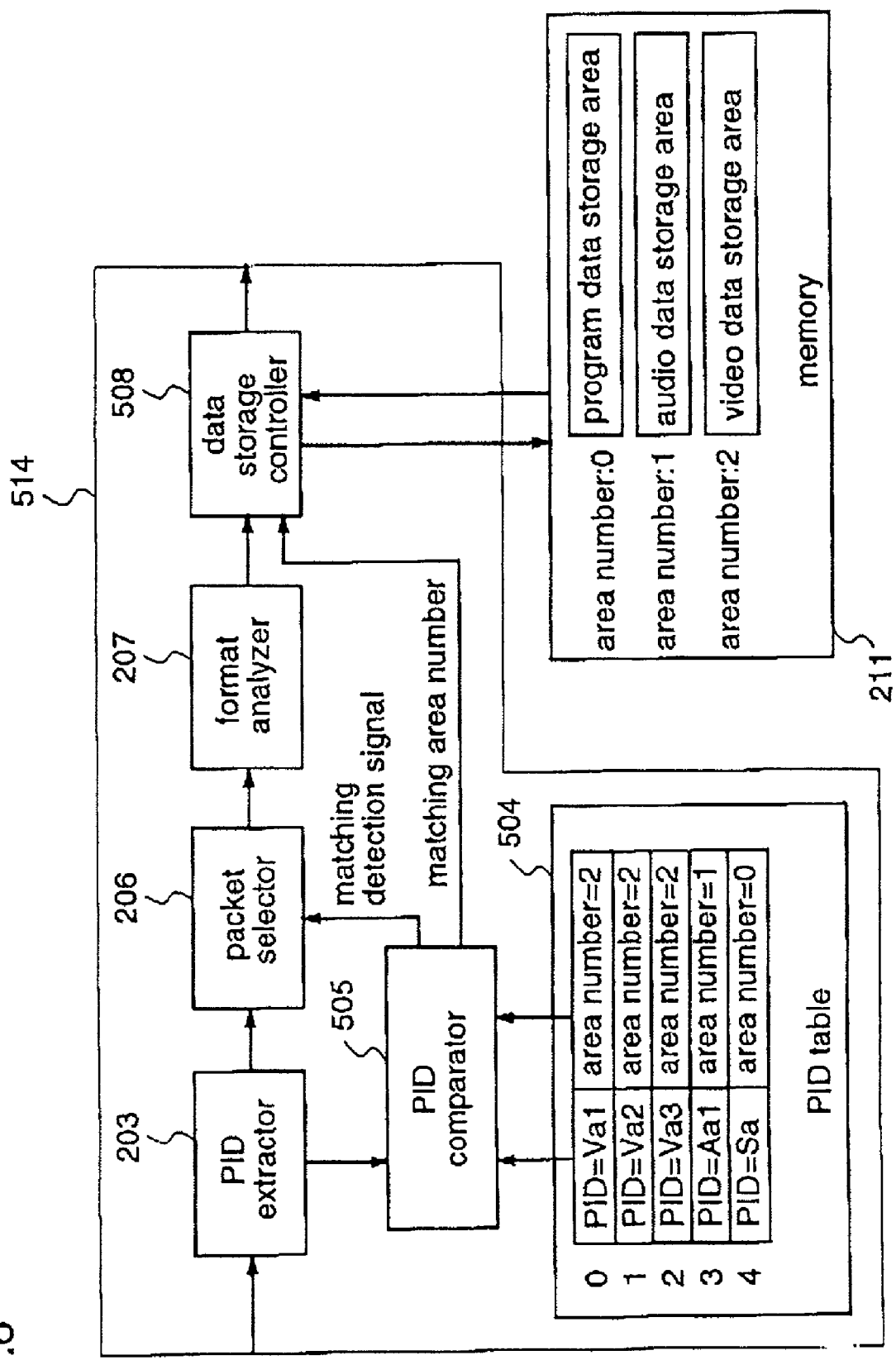
FIG. 6 is a block diagram illustrating the construction of a data selection/storage apparatus according to the third embodiment of the invention.

FIG. 6 is a block diagram illustrating the construction of a data selection/storage apparatus according to the third embodiment of the invention. In FIG. 6, the same reference numerals as those shown in FIG. 2 denote the same or corresponding parts.

FIG. 7(*a*) is a diagram illustrating a transport stream to be inputted to the demultiplexer, FIG. 5(*b*) is a diagram illustrating the contents of TS packets which are selected from the transport stream shown in FIG. 7(*a*) by the demultiplexer, and FIG. 7(*c*) is a diagram illustrating the state where the data selected by the demultiplexer are stored in the memory.

The transport stream shown in FIG. 7(*a*) is composed of two programs a and b comprising video data, audio data, and program data having PIDs shown in Table 1 and Table 2, respectively.

On a PID table 504 according to the third embodiment, not only the PIDs of data to be received but also the numbers indicating the storage areas in the memory 211 where TS packet data having the respective PIDs are stored (hereinafter referred to as storage area numbers) are entered. In order to select the program a by a demultiplexer 514, the PIDs and the corresponding storage area numbers are previously set by the CPU 213 on the PID table 504 as shown in Table 5.

TABLE 5

| PID entry No. | PID | storage area No. |
|---|---|---|
| 0 | Va1 | 2 |
| 1 | Va2 | 2 |
| 2 | Va3 | 2 |
| 3 | As1 | 1 |
| 4 | Sa | 0 |

When the transport stream shown in FIG. 7(*a*) is inputted to the PID extractor 203, the PID extractor 203 extracts the PID from each TS packet, and outputs it to the PID comparator 505.

The PID comparator 505 checks whether the PID received from The PID extractor 203 matches any of the PIDs which are set in the PID table 504. When the received PID matches any of the PIDs on the table 504, the PID comparator 505 notifies the packet selector 206 that there is a matching PID, as a matching detection signal. At the same time, the PID comparator 505 notifies the data storage controller 508 of the storage area number corresponding to the PID entry where the matching PID is set, as a matching area number. On the other hand, when the PID of the TS packet matches none of the PIDs on the DID table 504, the PID comparator 505 notifies the packet selector 206 that the comparison result is "mismatch", as a matching detection signal.

When the matching detection signal from the PID comparator 205 indicates "match", the packet selector 206 outputs the TS packet to the format analyzer 207. When the matching detection signal indicates "mismatch", the packet selector 206 discards the TS packet. As the result, as shown in FIG. 7(*b*), only the TS packets constituting the program a are selected from the transport stream inputted to the packet selector 206.

In the data storage controller 508, the matching area number received from the PID comparator 505 is added to each TS packet supplied from the format analyzer 207 and, further, each TS packet data is written in the storage area in the memory 211 which is indicated by the matching area number.

The data storage controller 508 according to the third embodiment manages three storage areas in the memory 211, i.e., the video data storage area (storage area number "2"), the audio data storage area (storage area number "1"), and the program data storage area (storage area number "0"). since the received three kinds of video data are given "2" as the storage area number as shown in Table 5, all of the video data having the three kinds of PIDs (Va1, Va2, Va3) are stored in one video data storage area.

Figure 7A:
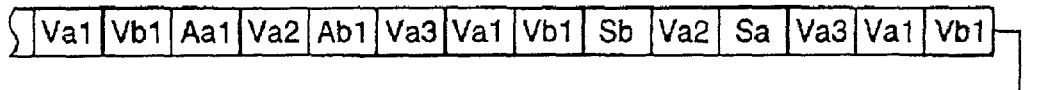
FIGS. 7(*a*)–7(*c*) are diagrams for explaining a data selection process by the data selection/storage apparatus according to the third embodiment of the invention.
Figure 7A:
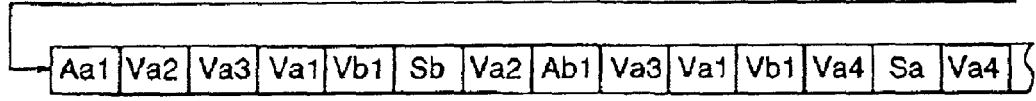
Figure 7A:
Figure 7B:
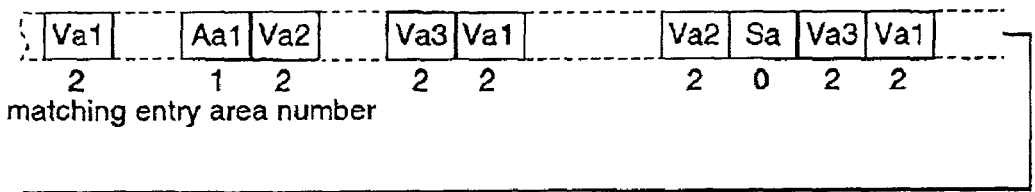
Figure 7B:
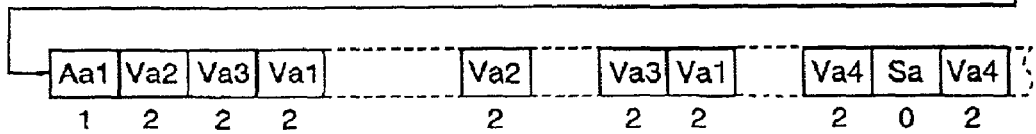
Figure 7B:
Figure 7C:
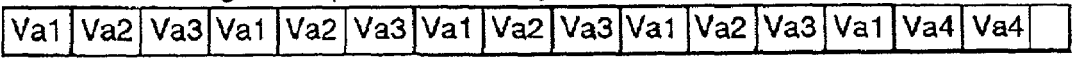
Figure 7C:
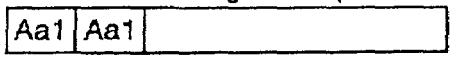
Figure 7C:

The AV decoder 212 controls the data storage controller 208 to read the video data of the program a from the video data storage area in tho memory 211. At this time, since the video data having the three kinds of PIDs (Va1, Va2, Va3)

are multiplexed and stored in the same video data storage area as shown in FIG. 7(c), the three kinds of video data to be reproduced are sequentially transmitted from the data storage controller 508 to the AV decoder 212.

As described above, even when the AV decoder 212 reproduces three kinds of video data, the AV decoder 212 can read the multiplexed three kinds of video data from one video data storage area as in the case where it reproduces one kind of video data, whereby three kinds of pictures can be reproduced simultaneously.

Embodiment 4

Hereinafter, a description will be given of, as a fourth embodiment of the invention, a data selection/storage apparatus which is able to perform smooth PID switching when the PID of video data to be broadcast is changed, In this fourth embodiment, the data selection/storage apparatus according to the third embodiment is provided with a PID switching function.

Conventionally, when the PID of video data received by the digital broadcast receiver is changed, the CPU must add a PID to be newly received to the PID table, and set a storage area for holding the corresponding video data in the memory so that the received video data can be recorded in this storage area.

That is, the CPU recognizes that the PID of video data to be received has been changed and the video data after the PID change has been stored in the newly set video data storage area, and thereafter, the CPU changes the storage area of the video data to be outputted to the AV decoder. Thereby, the AV decoder can start reproduction of the video data after the PID change.

In such PID switching operation, however, the CPU must keep watch on the timing of PID change, and set a video data storage area in the memory or change the storage area of the data to be outputted to the AV decoder. Therefore, the processing of the CPU is complicated. Furthermore, reproduction of the video data after the PID change is started with a delay from when the PID of video data is changed.

In order to solve the above-mentioned problem, the data selection/storage apparatus according to this fourth embodiment notifies the digital broadcast receiver that the PID of video data to be received will be changed, in advance of the change, by using program data, whereby smooth PID switching is realized.

Hereinafter, the data selection/storage apparatus according to the fourth embodiment will be described in more detail. Since the constructions of the digital broadcast receiver and the data selection/storage apparatus according to the fourth embodiment are identical to those of the third embodiment, FIGS. 2 and 6 will be employed for the description.

Figure 8A:
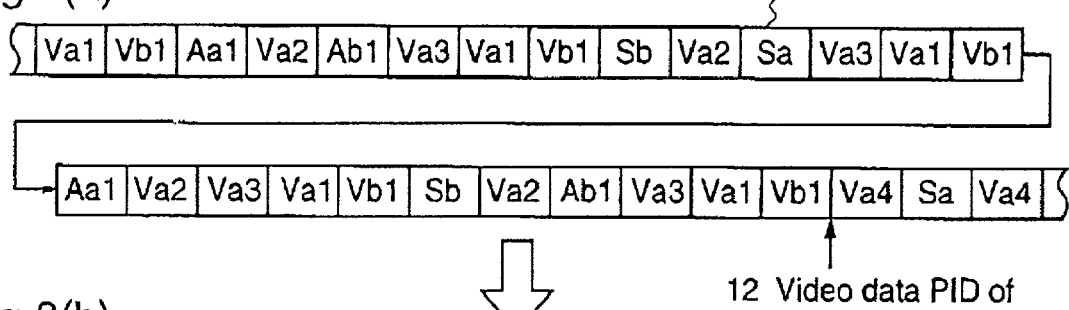
FIGS. 8(*a*)–8(*c*) are diagrams for explaining a data selection process by the data selection/storage apparatus according to the fourth embodiment of the invention.
Figure 8B:
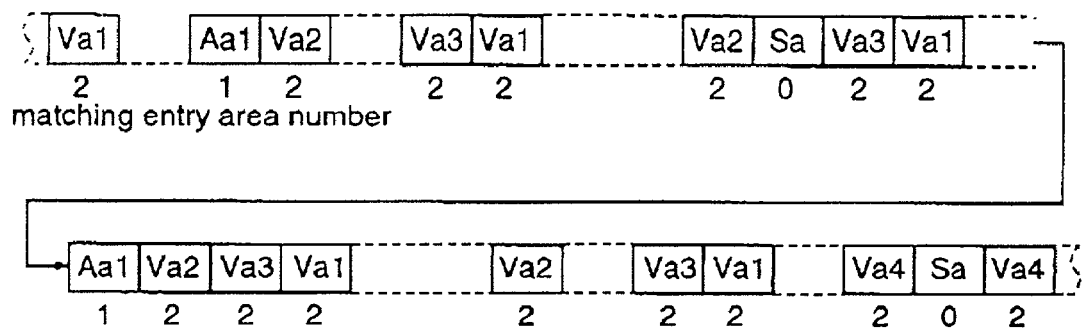
Figure 8C:
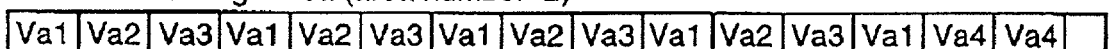
Figure 8C:
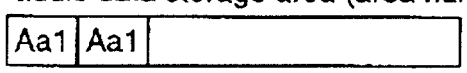
Figure 8C:
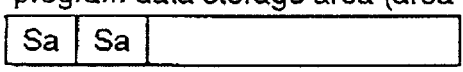

FIG. 8(a) is a diagram illustrating a transport stream to be inputted to the demultiplexer, FIG. 8(b) is a diagram illustrating the contents of TS packets which are selected from the transport stream shown in FIG. 8(a) by the demultiplexer, and FIG. 8(c) is a diagram illustrating the state where the data selected by the demultiplexer are stored in the memory.

The transport stream shown in FIG. 8(a) is composed of two programs a and b having video data, audio data, and program data with PIDs as shown in Table 1 and Table 2, respectively, as in the first embodiment.

In this fourth embodiment, it is assumed that, as shown in FIG. 8(a), the PID of the video data of the program a will be changed to Va4 at a PID change position 12 which is indicated by an arrow. In this case, the digital broadcast receiver 200 is previously notified that the PID of the video data will be changed from Va1, Va2, and Va3 to Va4 at the first program data Sa 11 shown in FIG. 7(a). That is, in the digital broadcast receiver 200, the program data Sa 11 is recorded in the program data storage area in the memory 211, and the CPU 213 reads the PID change notification by the program data Sa 11 from the program data storage area, whereby the CPU 213 can previously know the PID change.

When the CPU 213 is notified by the program data Sa that the PID of the video data will be changed, the CPU 213 sets the PID (=Va4) to be newly received in a vacant entry on the PID table 504. At this time, the CPU 213 performs the setting so that the PID (=Va4) which indicates the video data to be inputted after the PID change should be stored in the same storage area (storage area number "2" wherein the video data before the PID change is stored.

To be specific, for example, when the entry 5 on the PID table is vacant, an entry of PID=Va4 is newly set in the vacant entry 5, whereby the PID table 504 becomes as shown in Table 6.

TABLE 6

| PID entry No. | PID | storage area No. |
|---|---|---|
| 0 | Va1 | 2 |
| 1 | Va2 | 2 |
| 2 | Va3 | 2 |
| 3 | As1 | 1 |
| 4 | Sa | 0 |
| 5 | Va4 | 2 |

By setting the PIDs as shown in Table 6, the packet selector 206 can select the TS packet of PID=Va4 at the instant when the PID of the video data to be inputted to the demultiplexer 214 is changed to Va4, shown in FIG. 7(b). Further, since, on the PID table 504, the video data storage area number "2" is set as the storage area number for the TS packet of PID=Va4, the data storage controller 508 can automatically store the TS packet of PID=Va4 in the video data storage area as shown in FIG. 7(c).

As the result, the demultiplexer 514 can automatically and speedily select the data of the new PID at the instant when the PID of the video data to be received is changed, and the data of the new PID is continuously stored in the same video data storage area where the data before the PID change has been stored.

As described above, the data selection/storage apparatus according to the fourth embodiment obviates the necessity for the CPU 213 to keep watch on the PTD of the video data being received. Further, at the instant when the PID of video data to be reproduced is changed, the AV decoder 212 can continuously read the video data after the PID change from the same video data storage area where the video data before the PID change has been stored, and reproduce the read video data. Accordingly, the processing contents by the CPU 213 are facilitated, and the video data to be reproduced can be switched smoothly.

Embodiment 5

In a fifth embodiment of the present invention, a description will be given of a data selection/storage apparatus which realizes simultaneous decoding of video data and audio data of plural programs by multiplexing video data and audio data of different programs into plural AV data storage areas, respectively, and outputting these data to different AV decoders. Hereinafter, a description will be mainly given of the operation of the data selection/storage apparatus comprising a demultiplexer and a memory, with reference to FIGS. 9, 10, and 11.

Figure 9:
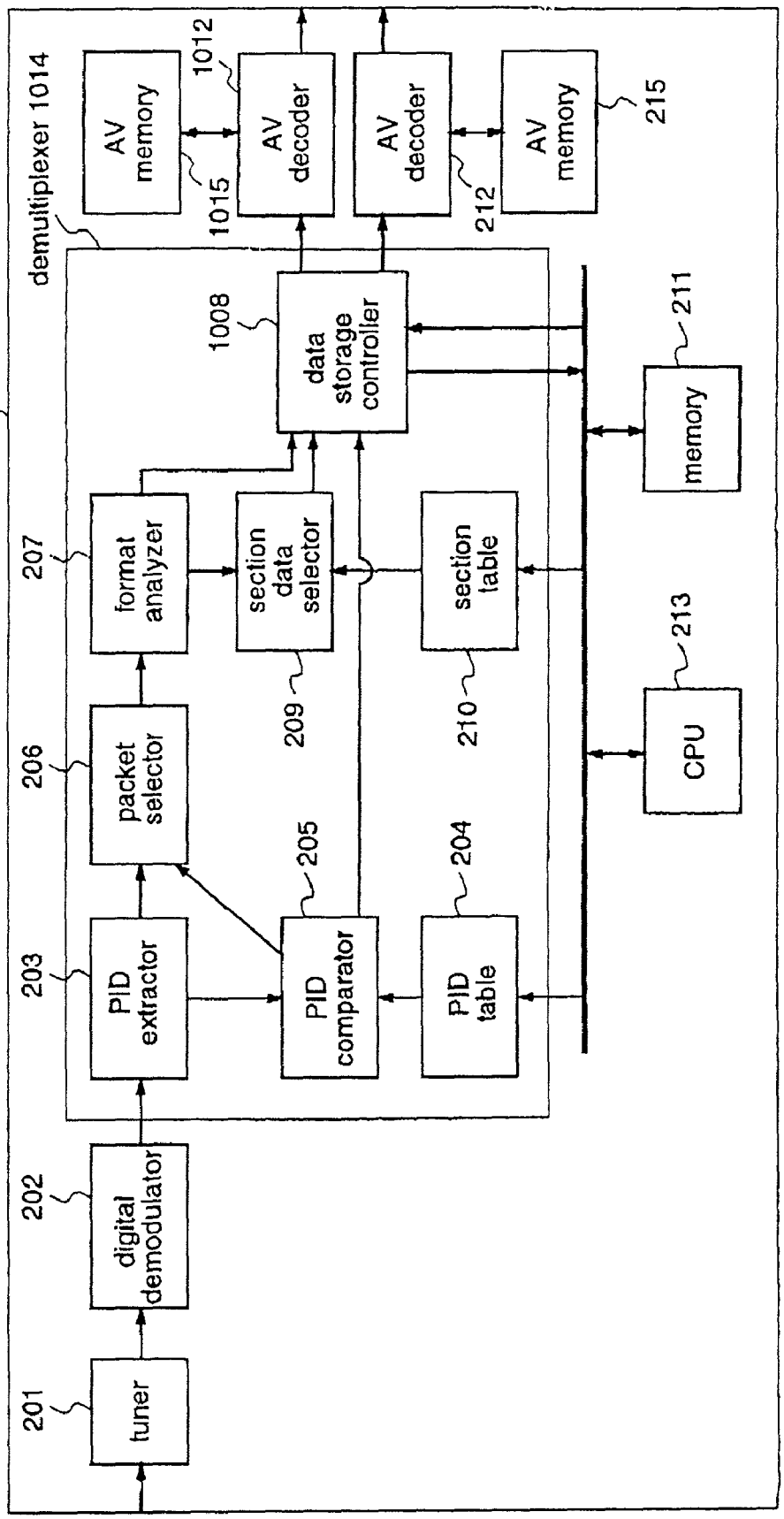
FIG. 9 is a block diagram illustrating the construction of a digital broadcast receiver according to a fifth embodiment of the present invention.

FIG. 9 is a block diagram illustrating the construction of a digital broadcast receiver according to the fifth embodiment. In FIG. 9, the same reference numerals as those shown in FIG. 2 denote the same or corresponding parts.

Figure 10:
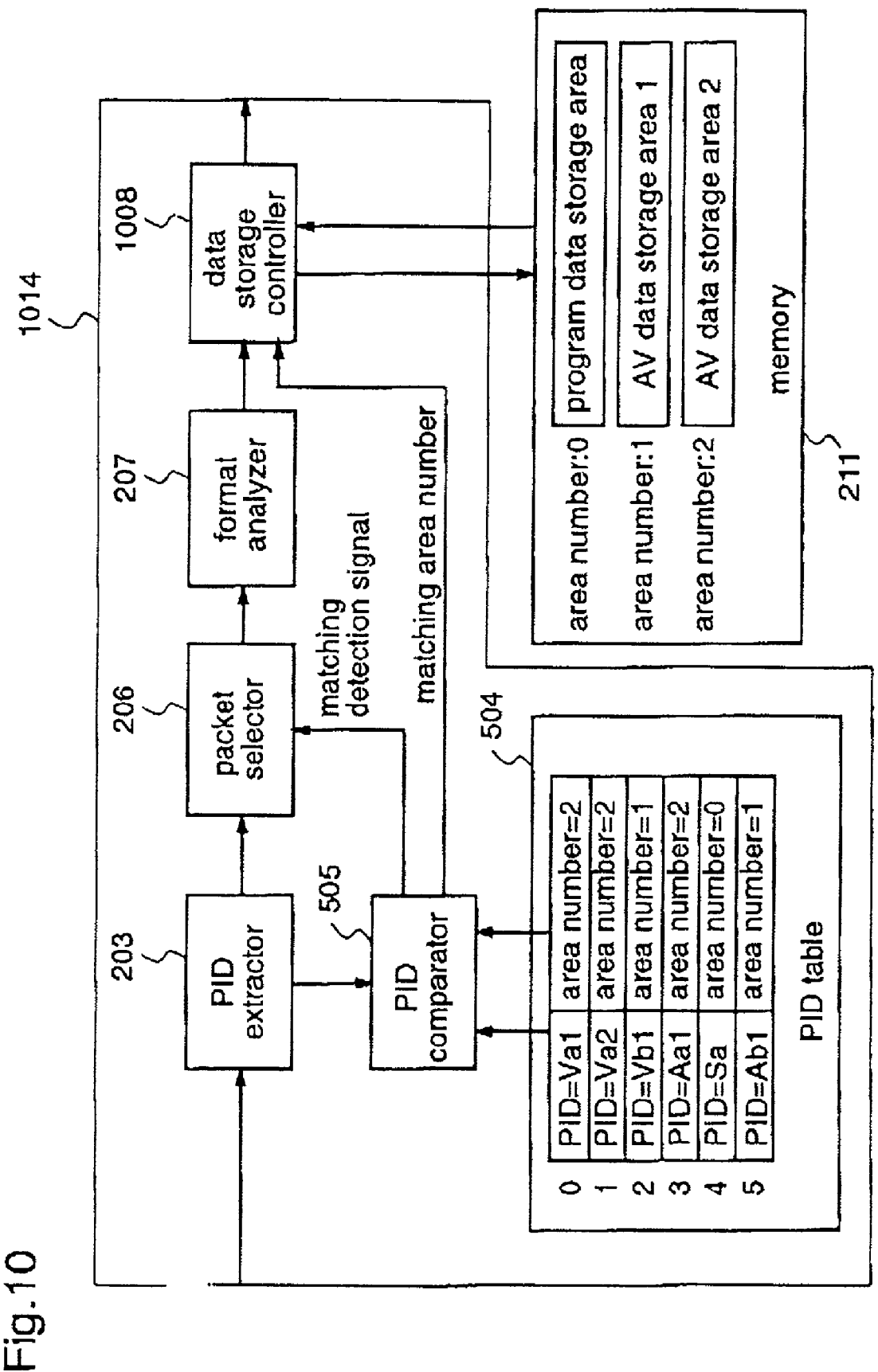
FIG. 10 is a block diagram illustrating the construction of a data selection/storage apparatus according to the fifth embodiment of the invention.

FIG. 10 is a block diagram illustrating the construction of the data selection/storage apparatus according to the fifth embodiment. In FIG. 10, the same reference numerals as those shown in FIG. 6 denote the same or corresponding parts.

Figure 11A:
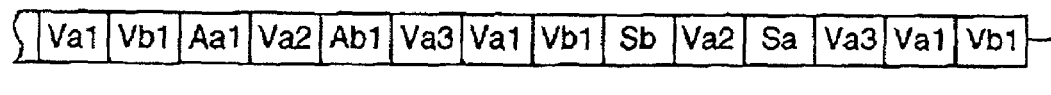
FIGS. 11(*a*)–11(*c*) are diagrams for explaining a data selection process by the data selection/storage apparatus according to the fifth embodiment of the invention.
Figure 11A:
Figure 11B:
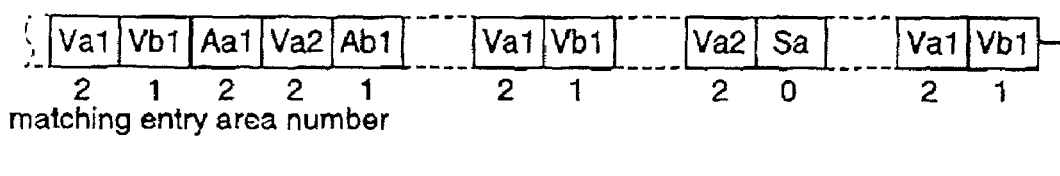
Figure 11B:
Figure 11C:
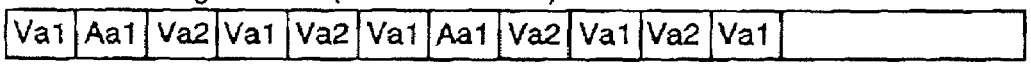
Figure 11C:
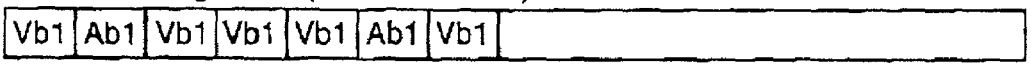
Figure 11C:
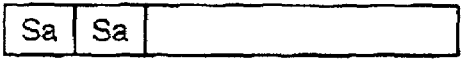

FIG. 11(a) is a diagram illustrating a transport stream to be inputted to the demultiplexer, FIG. 11(b) is a diagram illustrating the contents of TS packets which are selected from the transport stream shown in FIG. 11(a) by the demultiplexer, and FIG. 11(c) is a diagram illustrating the state where the data selected by the demultiplexer are stored in the memory. The transport stream shown in FIG. 11(a) is composed of two programs a and b having video data, audio data, and program data with PIDs as shown in Table 1 and Table 2, respectively, as in the first embodiment.

According to this fifth embodiment, in a digital broadcast receiver 1000 shown in FIG. 9, the program a is selected from the transport stream shown in FIG. 11(a) wherein the two programs a and b are multiplexed, and two of the three kinds of video data included in the program a and the audio data are decoded and reproduced by a first AV decoder 212 and, Simultaneously, the program b is selected from the transport stream, and the video data and the audio data included in the program b are decoded and reproduced by another AV decoder 1012.

In FIG. 10, on the PID table 504 of the data selection/storage apparatus according to the fifth embodiment, PIDs and storage area numbers as shown in Table 7 are preset by the CPU 213. Further, the data storage controller 1008 manages three storage areas in the memory 211, i.e., an AV data storage area 1 (storage area number "2"), an AV data storage area 2 (storage area "1"), and a program data storage area (storage area number "0"). The data storage controller 1008 multiplexes and stores the programs a and b into different AV data storage areas on the basis of the storage area numbers, and outputs them to different AV decoders at the time of decoding.

TABLE 7

| PID entry No. | PID | storage area No. |
|---|---|---|
| 0 | Va1 | 2 |
| 1 | Va2 | 2 |
| 2 | Vb1 | 1 |
| 3 | Aa1 | 2 |
| 4 | Sa | 0 |
| 5 | Ab1 | 1 |

When the transport stream shown in FIG. 11(a) is inputted to the PID extractor 203, the PID extractor 203 takes the PID from each TS packet, and outputs it to the PID comparator 505.

The PID comparator 205 checks whether the PID received from the PID extractor 203 matches any of the PIDs which are set on the PID table 504. When the received PID matches any of the PIDS on the PID table 504, the PID comparator 505 notifies the packet selector 206 that there is a matching PID, as a matching detection signal. At the same time, the comparator 505 notifies the data storage controller 508 of the storage area number of the PID entry where the matching PID is entered, as a matching PID entry number. On the other hand, when the PID of the TS packet matches none of the PIDs on the PID table 504, the PID comparator 505 notifies the packet selector 206 that the comparison result is "mismatch", as a matching detection signal.

When the matching detection signal from the PID comparator 505 indicates "match", the packet selector 206 outputs the corresponding TS packet to the format analyzer 207. When the matching detection signal indicates "mismatch", the packet selector 206 discards the TS packet. As the result, as shown in FIG. 11(b), the TS packets constituting the programs a and b are selected from the transport stream inputted to the packet selector 206.

The data storage controller 1008 writes the data of the respective TS packets supplied from the format analyzer 207, into the storage area in the memory 211, which area is indicated by the matching area number supplied from the PID comparator 505.

That is, the data storage controller 1008 stores the two kinds of video data (Va1 and Va2) and the audio data (Aa1) of the program a, which data are given "2" as the storage area number, into the AV data storage area 1, and stores the video data (Vb1) and the audio data (Ab1) of the program b, which data are given "1" as the storage area number, into the AV data storage area 2.

The AV decoder 212 controls the data storage controller 1008 to read the video data of the program a from the AV data storage area 1 in the memory 211. At this time, since the video data and audio data having the three kinds of PIDs (Va1, Va2, As1) are multiplexed and stored in the single AV data storage area 1 as shown in FIG. 11(c), the two kinds of video data and the one kind of audio data to be reproduced are sequentially transmitted from the data storage controller 1008 to the AV decoder 212. The AV decoder 212 reads the two kinds of video data and the one kind of audio data, from the data which comprises the TS packets having the PIDs of Va1, Va2, and Aa1 and is supplied from the data storage controller 1008, on the basis of the PIDs of the respective data, and decodes the data. Thereafter, the AV decoder 212 outputs the decoded video and audio data, i.e., the picture and sound of the program a.

In this way, plural kinds of video data and audio data constituting one program are multiplexed and stored in one AV data storage area, and the AV decoder decodes and reproduces these data.

Furthermore, video data and audio data of different programs are respectively multiplexed and stored into two AV data storage areas, and these data are transmitted to different AV decoders, whereby a digital broadcast receiver capable of simultaneous decoding of video and audio of plural programs is realized.

Therefore, it is possible to realize a digital broadcast receiver which is applicable to the use requiring plural AV decoding functions such that the output from the AV decoder 212 is displayed by a television receiver (not shown in FIG. 9) while the output from the AV decoder 1012 is recorded on a VTR (not shown in FIG. 9) (i.e., recording of a program on a different channel).

While in this fifth embodiment two AV decoders are employed, the present invention is not restricted thereto. The data storage controller may manage three or more AV data storage areas in the memory, and video and audio data stored in the respective AV data storage areas may be outputted to three or more AV decoders.

Embodiment 6

Next, a description will be given of, as a sixth embodiment of the invention, a data selection/storage apparatus in which an AV decoder 612 can decode plural kinds of video data to be reproduced simultaneously, when the plural kinds of video data are separately stored in different storage areas in a memory (refer to FIG. 13(c)).

Figure 12:
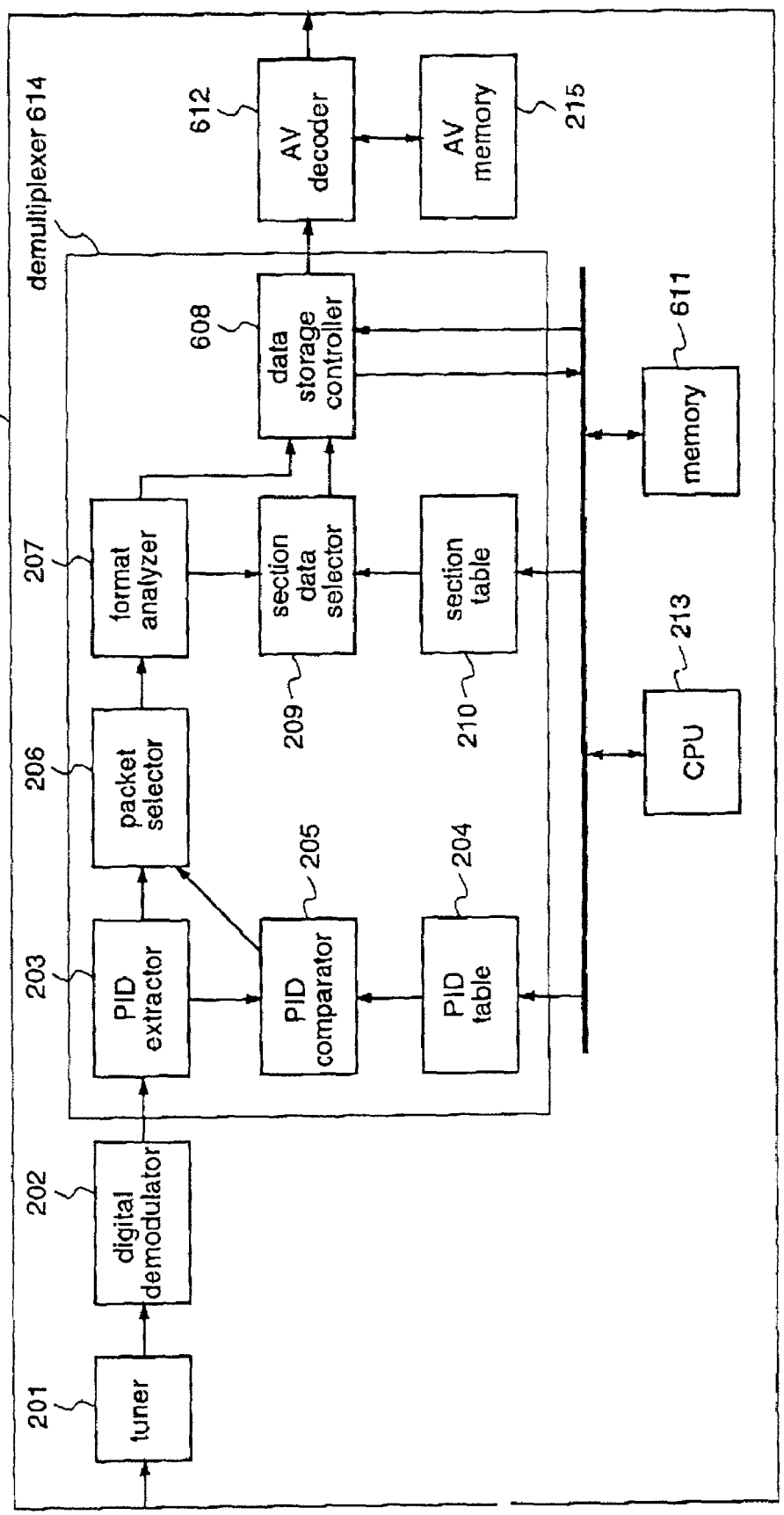
FIG. 12 is a block diagram illustrating the construction of a digital broadcast receiver according to a sixth embodiment of the present invention.

FIG. 12 is a block diagram illustrating the construction of a digital broadcast receiver 600 according to the sixth embodiment of the invention. In FIG. 12, the same reference numerals as those shown in FIG. 2 denote the same or corresponding parts.

In a demultiplexer 614, a data storage controller 608 stores plural kinds of video data into plural storage areas in a memory 611, respectively, as shown in FIG. 13(c). Further, an AV decoder 612 is able to generate plural video data request signals according to the number of the kinds of video data to be reproduced simultaneously.

According to plural video data request signals outputted from the AV decoder 612, the data storage controller 608 reads the video data corresponding to the respective video data request signals from plural video data storage areas in the memory 611, and outputs them to the AV decoder 612.

In the digital broadcast receiver 600 constructed as described above, the demultiplexer 614 takes plural kinds of video data required by the AV decoder 612 from plural video data storage areas in the memory 611, and supplies the data to the AV decoder 612. Therefore, the AV decoder 612 can reproduce the plural kinds of video data simultaneously, without considerably altering the construction of the interface connecting the data storage regions and the decoder.

While the first to fourth embodiments of the present invention have been described about the case where three kinds of video data constituting one program are simultaneously reproduced and displayed, the number of kinds of video data to be processed is not restricted thereto. Further, the number of programs including plural kinds of video data is not restricted to one, and the present invention is also applicable to the case where video data of plural programs are simultaneously reproduced by AV decoders.

Furthermore, while the first to fourth embodiments have been described about the case where plural kinds of video data are multiplexed, data to be multiplexed are not restricted to video data. The present invention is also applicable to the case where plural kinds of audio data are multiplexed and transmitted to the AV decoder, or the case where audio data and video data are multiplexed and tansmitted to the AV decoder.

Furthermore, while the first to sixth embodiments of the invention are described taking digital broadcasting as an example, the present invention is not restricted to digital broadcasting, and it may be applied to reproduction of pictures or sounds from a recording medium such as a digital video recorder, a multimedia memory card, or the like, or reception/reproduction of video data and audio data which are transmitted through a communication medium such as IEEE1394.

What is claimed is:

1. A data selection/storage apparatus having a data selection means for selecting specific kinds of data from multiplexed data in which plural kinds of data are multiplexed, and a data storage means having plural storage areas for holding the data selected by the data selection means, wherein
among the data selected by the data selection means, plural kinds of data which have previously been specified are multiplexed and stored in one storage area by the data storage means, wherein said data selection means comprises:
an identification number extraction means for extracting an identification number which indicates the kind of each data, from the multiplexed data in which plural kinds of data are multiplexed;
an identification number storage means having plural identification number entries which holds identification numbers of data to be selected;
an identification number matching detection means for detecting whether or not the identification number extracted from the multiplexed data matches at least one of the plural identification numbers stored in the identification number storage means;
a data extraction means for extracting, from the multiplexed data, the data which matches the identification number stored in the identification number storage means;
an identification code addition means for adding an identification code for identifying the kind of data, to the data extracted by the data extraction means;
a data storage control means for storing each data in a predetermined storage area in the data storage means, on the basis of the identification code which is added to the data by the identification code addition means; and
when it has previously been specified that plural kinds of data which are selected from the multiplexed data and have different identification numbers should be stored in one storage area in the data storage means, the data storage control means multiplexes the plural kinds of data and stores the multiplexed data in the storage area.

2. A data selection/storage apparatus as defined in claim 1, wherein
said identification code addition means adds the number of an identification number entry in the identification number storage means, as an identification code, to the data having the corresponding identification number; and
when it has previously been specified that plural kinds of data having different identification codes should be stored in one storage area, said data storage control means multiplexes the plural kinds of data and stores the multiplexed data in the storage area.

3. A data selection/storage apparatus as defined in claim 2, wherein when there are plural correspondences between plural identification codes and one storage area, said data storage control means multiplexes the plural kinds of data having different identification codes and stores the multiplexed data in the corresponding storage area, on the basis of the correspondences between the identification codes and the data storage area, which have previously been specified.

4. A data selection/storage apparatus as defined in claim 1, wherein
each of the identification number entries in the identification number storage means stores not only the identification number of data to be selected but also a storage area number which indicates a storage area in the data storage means wherein the data having the corresponding identification number should be stored;
said identification code addition means adds the storage area number in the identification number storage means, as an identification code, to each data extracted by the data extraction means; and
when the same storage area number is stored for different identification numbers in the identification number storage means, the data storage control means multiplexes the plural kinds of data having the different identification numbers and stores the multiplexed data in the storage area having the storage area number.

5. A data selection/storage apparatus as defined in claim 4, wherein
when there are plural correspondences between different identification numbers and the same storage area number in the identification number storage means, the data storage control means multiplexes the plural kinds of data indicated by the different identification numbers and stores the multiplexed data in the storage area indicated by each storage area number, on the basis of the storage area number.

6. A data selection/storage apparatus as defined in claim 1 wherein, when plural kinds of data having different identification numbers are to be storage in the same storage area in the data storage means, the data storage control means stores information for identifying each data together with the data.

7. A data selection/storage apparatus as defined in claim 1, wherein information in each identification number entry which is stored in the identification number storage means can be arbitrarily set by an external control circuit.

8. A data selection/storage apparatus as defined in claim 7, wherein
when the kind of data to be inputted to the data selection/storage apparatus should be changed, information indicating the kind of data to be newly inputted is transmitted, in advance of the change, to the external control circuit; and
the information in each identification number entry which is stored in the identification number storage means is newly set on the basis of the information indicating the kind of data to be newly inputted.

9. A data processing apparatus comprising a data selection/storage apparatus according to claim 1, and a data reproduction apparatus for reading the data stored in the data storage means of the data selection/storage apparatus and reproducing the read data, wherein
said data reproduction apparatus reads, from a storage area wherein plural kinds of data having different identification numbers are multiplexed, the multiplexed data and reproduces the multiplexed data, which storage area is included in the data storage means of the data selection/storage apparatus.

10. A data processing apparatus as defined in claim 9, wherein
a plurality of said data reproduction apparatuses are provided; and
when the data selection/storage apparatus has plural storage areas, each holding multiplexed plural kinds of data, each of the plural data reproduction apparatuses reads the multiplexed data from the corresponding storage area, and reproduces the read data.

11. A data processing apparatus comprising:
a data selection/storage unit having a data selection means for selecting specific kinds of data from multiplexed data in which plural kinds of data are multiplexed, and a data storage means having plural storage areas for holding the data selected by the data selection means, wherein said data selection means comprises:
an identification number extraction means for extracting an identification number which indicates the kind of each data, from the multiplexed data in which plural kinds of data are multiplexed;
an identification number storage means having plural identification number entries which holds identification numbers of data to be selected;
an identification number matching detection means for detecting whether or not the identification number extracted from the multiplexed data matches at least one of the plural identification numbers stored in the identification number storage means;
a data extraction means for extracting, from the multiplexed data, the data which matches the identification number stored in the identification number storage means;
an identification code addition means for adding an identification code for identifying the kind of data, to the data extracted by the data extraction means;
a data storage control means for storing each data in a predetermined storage area in the data storage means, on the basis of the identification code which is added to the data by the identification code addition means; and
when it has previously been specified that plural kinds of data which are selected from the multiplexed data and have different identification numbers should be stored in one storage area in the data storage means, the data storage control means multiplexes the plural kinds of data and stores the multiplexed data in the storage area;
a data reproduction unit for reading the data stored in the data storage means of the data selection/storage unit, and reproducing the read data;
wherein said data selection/storage unit stores plural kinds of data, among the data selected by the data selection means, into plural storage areas, respectively; and
said data reproduction unit is able to output plural data request signals as many as the number of kinds of data to be reproduced simultaneously.

* * * * *